US012588121B1

(12) United States Patent
Huang

(10) Patent No.: US 12,588,121 B1
(45) Date of Patent: Mar. 24, 2026

(54) POWER COMPENSATION METHOD FOR SERIAL CONNECTION PLC STRING

(71) Applicant: POWER MOS ELECTRONICS LIMITED, Wanchai (CN)

(72) Inventor: Ping Huang, Shenzhen (CN)

(73) Assignee: POWER MOS ELECTRONICS LIMITED, Wanchai (CN)

( * ) Notice: Subject to any disclaimer, the term of this patent is extended or adjusted under 35 U.S.C. 154(b) by 0 days.

(21) Appl. No.: 19/351,964

(22) Filed: Oct. 7, 2025

(51) Int. Cl.
*H05B 45/325* (2020.01)
*H05B 45/20* (2020.01)

(52) U.S. Cl.
CPC ........... *H05B 45/325* (2020.01); *H05B 45/20* (2020.01)

(58) Field of Classification Search
None
See application file for complete search history.

(56) References Cited

U.S. PATENT DOCUMENTS 8,570,160 B2 * 10/2013 Speegle ................. H04B 3/542 340/288
9,319,104 B2 * 4/2016 Speegle ............... H05B 47/185
9,596,739 B2 * 3/2017 Laherty ................. G06F 21/305
9,660,725 B2 * 5/2017 Parello ............... H04B 10/1149
9,788,378 B2 * 10/2017 Bendtsen ................ F21S 8/086
9,939,117 B1 * 4/2018 Peng ......................... F21S 4/10
9,967,960 B2 * 5/2018 Bora ...................... H05B 47/19
10,102,226 B1 * 10/2018 Cosic .................. G06F 16/5854
10,667,360 B2 * 5/2020 DeMayo ................ H05B 45/20
10,697,598 B1 * 6/2020 Chen ......................... F21S 4/10
10,716,181 B2 * 7/2020 DeMayo ................ H05B 45/22
10,728,970 B2 * 7/2020 Shao ...................... H05B 45/12
10,802,578 B2 * 10/2020 Lee .......................... G06T 7/70
10,845,036 B2 * 11/2020 Shao .......................... F21S 4/26
10,885,106 B1 * 1/2021 Cosic .................. G06F 16/5838
11,657,085 B1 * 5/2023 Cosic .................... G06F 3/0482 707/770
12,163,631 B1 * 12/2024 Sadwick ................. F21K 9/275
2014/0055250 A1 * 2/2014 Speegle ............... H05B 47/185 375/257
2015/0204561 A1 * 7/2015 Sadwick .................. F24F 11/33 236/1 C
2015/0312995 A1 * 10/2015 Bora ...................... H05B 45/20 315/297
2016/0140999 A1 * 5/2016 Cosic ....................... H04N 9/87 386/278

(Continued)

FOREIGN PATENT DOCUMENTS

GB 2548209 A * 9/2017 ........... H01R 25/147

*Primary Examiner* — Srinivas Sathiraju
(74) *Attorney, Agent, or Firm* — Birch, Stewart, Kolasch & Birch, LLP

(57) ABSTRACT

ABSTRACT A power compensation method for a serial connection color-blending LED string with power line communication is provided. An opening duration of each driving channel of the LED driver is continuous and non-overlapping while turning on to generate currents. With the LED packages connected in series, after the LED driver turns on the third driving channel during the third opening duration, the LED driver turns on a compensation channel to generate a compensation current to compensate a following LED package for maintaining a driving current, and to provide the same power to each LED package.

9 Claims, 5 Drawing Sheets

(56) References Cited

U.S. PATENT DOCUMENTS

| | | | | |
|---|---|---|---|---|
| 2016/0142650 | A1* | 5/2016 | Cosic | H04N 5/272 348/231.99 |
| 2016/0273717 | A1* | 9/2016 | Krames | G02B 6/0073 |
| 2017/0105265 | A1* | 4/2017 | Sadwick | H05B 45/60 |
| 2017/0354013 | A1* | 12/2017 | DeMayo | H05B 47/125 |
| 2018/0149802 | A1* | 5/2018 | Krames | F21S 4/20 |
| 2018/0181196 | A1* | 6/2018 | Lee | G06F 3/012 |
| 2018/0228000 | A1* | 8/2018 | Aykroyd | F21S 2/00 |
| 2018/0279429 | A1* | 9/2018 | Sadwick | F21K 9/27 |
| 2019/0021154 | A1* | 1/2019 | Sadwick | H05B 45/34 |
| 2019/0035569 | A1* | 1/2019 | Sadwick | H05B 45/20 |
| 2019/0082513 | A1* | 3/2019 | DeMayo | H05B 45/20 |
| 2019/0082515 | A1* | 3/2019 | DeMayo | H05B 47/125 |
| 2019/0090330 | A1* | 3/2019 | Aykroyd | H05B 47/185 |
| 2019/0098722 | A1* | 3/2019 | DeMayo | H05B 45/22 |
| 2019/0098725 | A1* | 3/2019 | Sadwick | H05B 45/20 |
| 2019/0353839 | A1* | 11/2019 | Krames | A61M 21/00 |
| 2020/0154538 | A1* | 5/2020 | Smith | H05B 47/184 |
| 2020/0314333 | A1* | 10/2020 | Liang | H04N 7/181 |
| 2020/0323072 | A1* | 10/2020 | Aykroyd | H01R 25/147 |
| 2020/0398836 | A1* | 12/2020 | Wu | B60W 30/16 |
| 2021/0402132 | A1* | 12/2021 | Krames | A61M 21/00 |
| 2022/0046776 | A1* | 2/2022 | Aykroyd | H05B 45/24 |
| 2022/0161797 | A1* | 5/2022 | Wu | B60W 30/16 |
| 2023/0330383 | A1* | 10/2023 | Krames | G02B 6/0073 |
| 2024/0244333 | A1* | 7/2024 | Jang | H04N 23/16 |
| 2024/0342595 | A1* | 10/2024 | Pean | A63F 13/424 |

* cited by examiner

POWER COMPENSATION METHOD FOR SERIAL CONNECTION PLC STRING

BACKGROUND OF THE INVENTION

1. Field of the Invention

The present invention relates to a power control method for a light emitting diode (LED) string, especially for a power compensation method for a color-blending LED string with power line communication connected in series.

2. Description of the Related Art

While lighting up an LED string with LED packages, an LED driver is needed. The LED driver can be divided into two categories based on the usage: a constant voltage LED driver and a constant current LED driver.

The constant voltage LED driver regulates an output voltage and maintains the output voltage regardless of a current draw of the LED string. On the other hand, the constant current LED driver regulates an output current and maintains the output current regardless of an input voltage or a load change of the LED string.

With reference to FIG. 5, FIG. 5 is a current-time diagram of a conventional current compensation method. Take the constant current LED driver as an example, while lighting up the LED string, and the LED packages are connected in series, each of the LED packages on the LED string should receive a same amount of current. That is, if a preceding LED package and a following LED package emit different colors, which requires different currents on the following LED package to emit, a compensation current from the preceding LED package to the following LED package is needed to maintain the output current on the LED string.

For example, in FIG. 5, when a preceding LED driver of the preceding LED package turns on a first driving channel, that is, emitting a first LED, a first compensation channel will not be turned on. In contrast, when the preceding LED driver turns off the first driving channel, that is, extinguishing the first LED, the first compensation channel will be turned on to maintain the output current to the following LED.

With the conventional current control method, if the LED package on the LED string is an RGB LED package, and if each of the driving channels of the LED driver requires the same amount of current to emit an LED on the driving channels, a triple amount of the output current is needed to pass through the LED string, causing high peak output current and various voltage drops on the LED string, further causing high power consumption. Furthermore, as the number of the LED packages on the LED string increases, the voltage drop on the LED string will cause power delivery issues to the following LED pack, further causing malfunction.

The conventional current control method provides a driving method for driving the LED string in constant current, but cannot avoid causing high power consumption. Therefore, it is necessary to propose improvements to the conventional current control method.

SUMMARY OF THE INVENTION

In view of this, the present invention provides a power compensation method for a color-blending light emitting diode (LED) string connected in series with power line communication (PLC), executed by an LED driver of an LED package on a color-blending LED string, allowing the LED driver to reduce a total current of the color-blending LED string, further reducing high peak output current and voltage drop on the color-blending LED string, and resulting in reducing power consumption.

The power compensation method includes:

turning on a first driving channel of the LED driver to generate a first current, and simultaneously turning off a second driving channel and a third driving channel to stop generating a second current and a third current of the LED driver during a first opening duration;

turning on the second driving channel to generate the second current, and simultaneously turning off the first driving channel and the third driving channel to stop generating the first current and the third current during a second opening duration;

turning on the third driving channel to generate the third current, and simultaneously turning off the first driving channel and the second driving channel to stop generating the first current and the second current during a third opening duration; and turning on a compensation channel to generate a compensation current, and simultaneously turning off the first driving channel, the second driving channel, and the third driving channel during a compensation opening duration.

Moreover, the first opening duration, the second opening duration, the third opening duration, and the compensation opening duration are continuous and non-overlapping.

It should be noted that, the first driving channel generates the first current through a first LED of the LED package of the color-blending LED string, the second driving channel generates the second current through a second LED of the LED package of the color-blending LED string, and the third driving channel generates the third current through a third LED of the LED package of the color-blending LED string.

The present invention also provides a color-blending LED package. The color-blending LED package includes an input pin, an output pin, a first LED, a second LED, a third LED, and an LED driver. The LED driver includes a first driving channel electrode, a second driving channel electrode, a third driving channel electrode, a power channel electrode, and a common electrode.

The first LED includes a first anode and a first cathode, the second LED includes a second anode and a second cathode, and the third LED includes a third anode and a third anode. The first driving channel electrode is connected to the first anode, the second driving channel electrode is connected to the second anode, and the third driving channel electrode is connected to the third anode. The power channel electrode is connected to the input pin. The common electrode is connected to the first cathode, the second cathode, the third cathode, and the output pin.

Firstly, the LED driver turns on a first driving channel to generate a first current outputted from the first driving channel electrode, and simultaneously turns off a second driving channel and a third driving channel to stop generating a second current outputted from the second driving channel electrode and a third current outputted from the third driving channel electrode during a first opening duration.

Secondly, the LED driver turns on the second driving channel to generate the second current, and simultaneously turns off the first driving channel and the third driving channel to stop generating the first current and the third current during a second opening duration.

Thirdly, the LED driver turns on the third driving channel to generate the third current, and simultaneously turns off the first driving channel and the second driving channel to stop generating the first current and the second current during a third opening duration.

Lastly, the LED driver turns on a compensation channel to generate a compensation current outputted from the common electrode, and simultaneously turns off the first driving channel, the second driving channel, and the third driving channel during a compensation opening duration.

The first opening duration, the second opening duration, and the third opening duration are continuous and non-overlapping, and the first current flows through the first LED, the second current flows through the second LED, and the third current flows through the third LED.

The power compensation method for a color-blending LED string connected in series with PLC of the present invention allows the LED driver to reduce the total current of the LED string, further reducing high peak output current and voltage drop on the LED string, and resulting in reducing power consumption compared to the conventional current control method.

Furthermore, the LED driver turns on the compensation channel to generate the compensation current to compensate a following LED package for maintaining a driving current.

Moreover, the power compensation method can be used in the LED packages connected in series in the color-blending LED string. The compensation current can compensate the driving current during the compensation opening duration within an emitting period of the LED driver and ensures the same power for each of the serial LED packages.

DETAILED DESCRIPTION OF THE INVENTION

Figure 1:
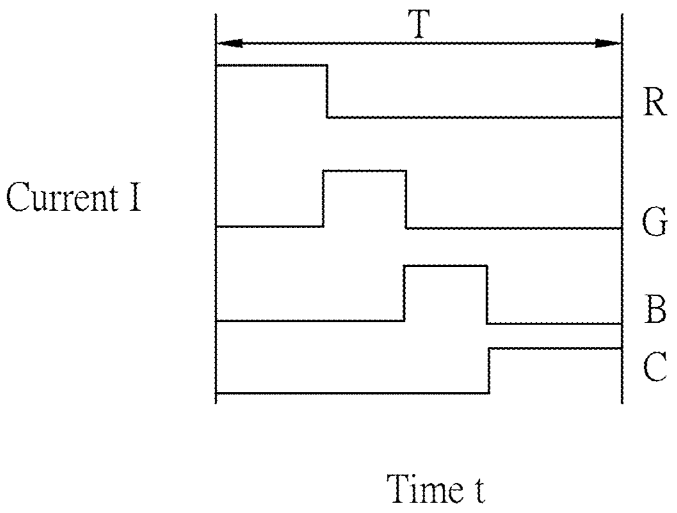
FIG. 1 is a current-time diagram of a power compensation method for a color-blending LED string with PLC of the present invention.
Figure 2:
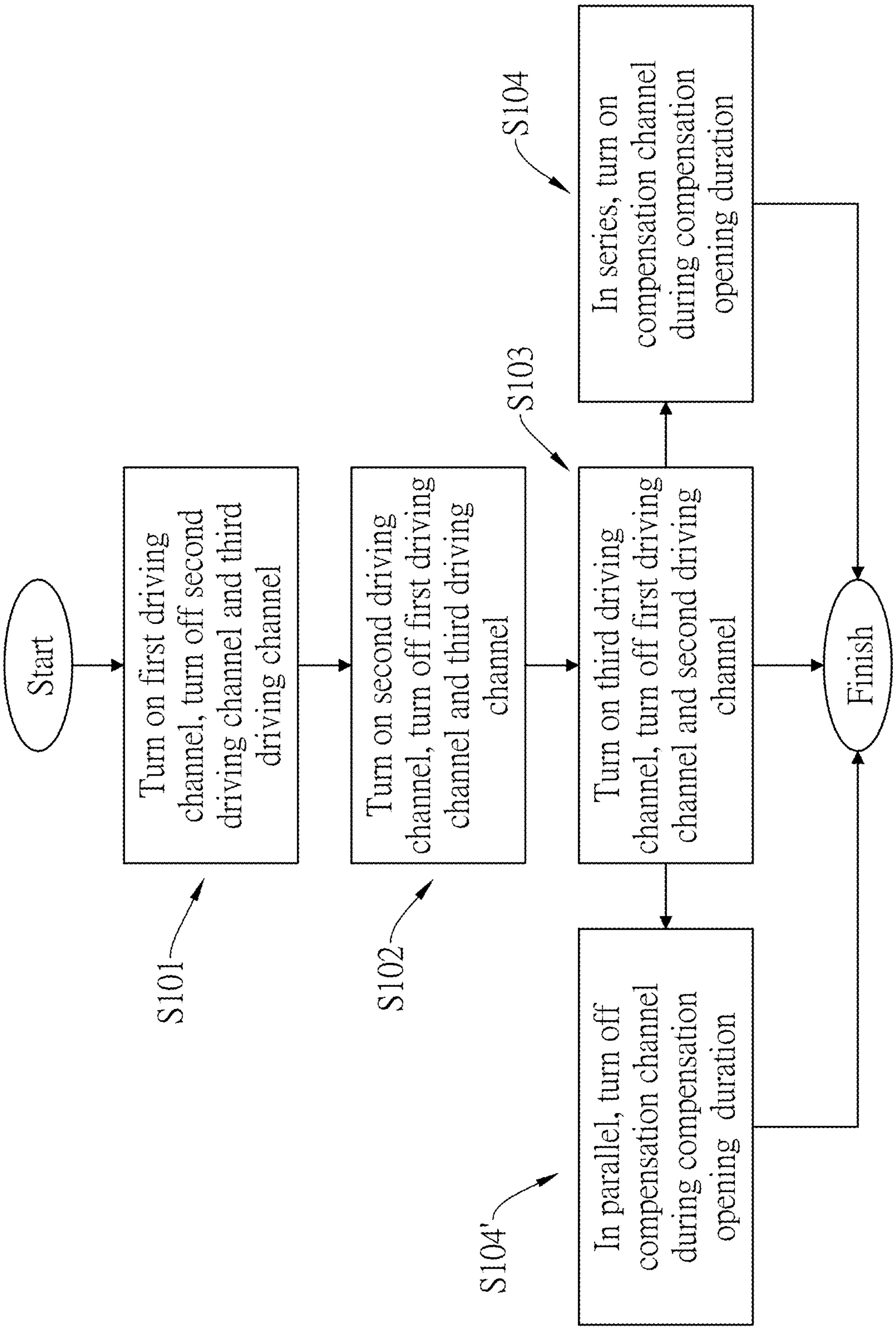
FIG. 2 is a flowchart of the power compensation method for the color-blending LED strip with PLC of the present invention.

With reference to FIG. 1 and FIG. 2, FIG. 1 is a current-time diagram of a power compensation method for a color-blending light emitting diode (LED) string with power line communication (PLC) of the present invention, and FIG. 2 is a flowchart of the power compensation method for the color-blending LED string with PLC of the present invention.

The power compensation method is executed by an LED driver of an LED package of the color-blending LED string. The power compensation method includes the following steps:

- step S101: turning on a first driving channel of the LED driver to generate a first current, and simultaneously turning off a second driving channel and a third driving channel to stop generating a second current and a third current of the LED driver during a first opening duration;
- step S102: turning on the second driving channel to generate the second current, and simultaneously turning off the first driving channel and the third driving channel to stop generating the first current and the third current during a second opening duration; and
- step S103: turning on the third driving channel to generate the third current, and simultaneously turning off the first driving channel and the second driving channel to stop generating the first current and the second current during a third opening duration.

The first driving channel of the LED driver generates the first current through a first LED of the LED package of the color-blending LED string, the second driving channel of the LED driver generates the second current through a second LED of the LED package of the color-blending LED string, and the third driving channel of the LED driver generates the third current through a third LED of the LED package of the color-blending LED string.

In the embodiment, the first opening duration, the second opening duration, and the third opening duration are continuous and non-overlapping while turning on for outputting currents. That is, the first opening duration, the second opening duration, and the third opening duration are continuous and non-overlapping.

In one embodiment, the power compensation method further includes the following step:

- step S104: turning on a compensation channel to generate a compensation current, and simultaneously turning off the first driving channel, the second driving channel, and the third driving channel during a compensation opening duration.

In this embodiment, the LED packages are connected in series in the color-blending LED string.

In another embodiment, the power compensation method further includes the following step:

- step S104': turning off a compensation channel for stopping outputting a compensation current, and simultaneously turning off the first driving channel, the second driving channel, and the third driving channel during a compensation opening duration.

In this embodiment, the LED packages are connected in parallel in the color-blending LED string.

In the above embodiments, the first opening duration, the second opening duration, the third opening duration, and the compensation opening duration are continuous and non-overlapping. Moreover, an emitting period of the LED driver is composed of the first opening duration, the second opening duration, the third opening duration, and the compensation opening duration. Furthermore, the compensation channel generates the compensation current to an output pin of the LED package, and the compensation current is used to compensate a following LED package for maintaining a driving current of the LED.

In one embodiment, the first current, the second current, the third current, and the compensation current are superimposed on a power current, and the LED driver generates the first current, the second current, the third current, and the compensation current according to a driving signal identified by a duration of a current change of the power current.

In the embodiment, the power current implies multiple driving signals of how the LED driver should turn on the first driving channel, the second driving channel, the third driving channel, and the compensation channel of the LED driver. For example, the driving signals include a first duration signal, a second duration signal, and a third duration signal.

The first duration signal represents the first opening duration of the first LED channel to be turned on. The second duration signal represents the combination of the first opening duration of the first LED channel and the second opening duration of the second LED channel to be turned on. The third duration signal represents the combination of the first opening duration, the second opening duration, and the third opening duration of the third LED channel to be turned on.

Furthermore, the LED driver is preset with the emitting period, that is, when the LED driver receives the driving signals, the LED driver calculates the first opening duration of the first LED channel, the second opening duration of the second LED channel, and the third opening duration of the third LED channel to be turned on.

When the LED driver receives the first duration signal, the LED driver turns on the first LED channel for the first opening duration regarding the first duration signal. When the LED driver receives the second duration signal, the LED driver calculates a first-second duration difference from the first duration signal and the second duration signal, and turns on the second LED channel for the second opening duration regarding the first-second duration difference. When the LED driver receives the third duration signal, the LED driver calculates a second-third duration difference from the second duration signal and the third duration signal, and turns on the third LED channel for the third opening duration regarding the second-third duration difference.

When a sum of the first opening duration, the second opening duration, and the third opening duration is less than the emitting period, the LED driver further calculates the compensation opening duration, and turns on the compensation channel to generate the compensation current during the compensation opening duration.

In one embodiment, the driving signal is a pulse-width modulation (PWM) driving signal.

Figure 3:
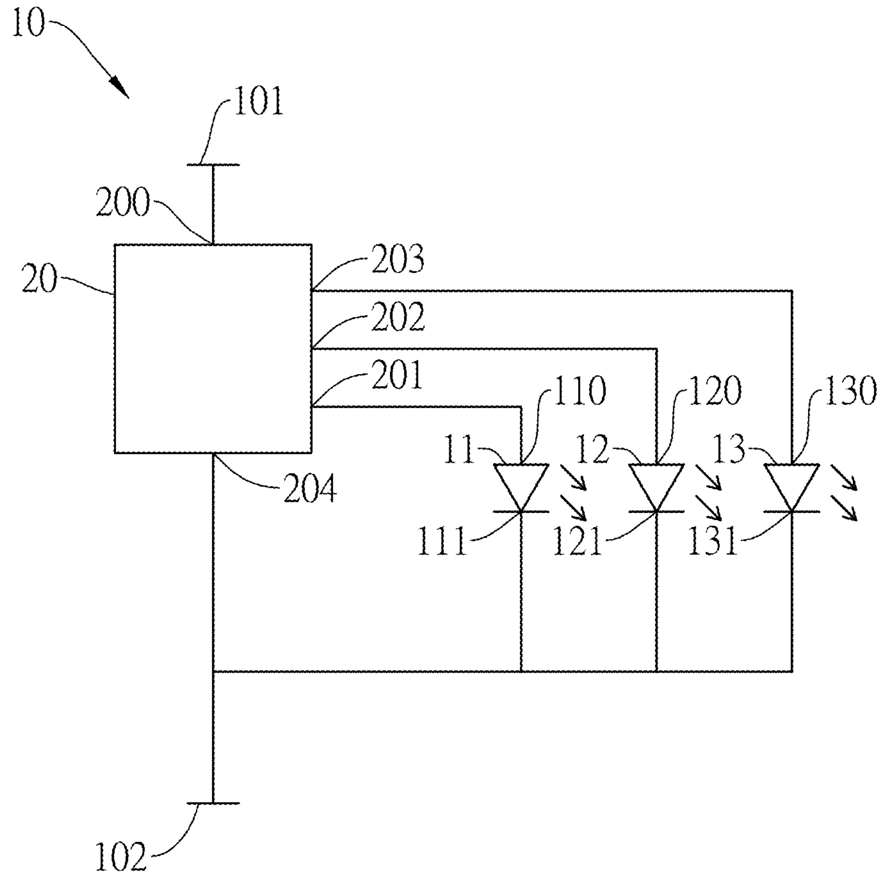
FIG. 3 is a circuit diagram of the power compensation method for the color-blending LED package of the present invention.

With reference to FIG. 3, FIG. 3 is a circuit diagram of the power compensation method for the color-blending LED package of the present invention.

The present invention provides a color-blending LED package 10. The LED package 10 includes an input pin 101, an output pin 102, a first LED 11, a second LED 12, a third LED 13, and an LED driver 20. Moreover, a color-blending LED string includes a power connection, a main controller, and multiple color-blending LED packages, and the color-blending LED packages are connected in series. The main controller transmits multiple driving signals to the LED packages 10.

The first LED 11 includes a first anode 110 and a first cathode 111; the second LED 12 includes a second anode 120 and a second cathode 121; and the third LED 13 includes a third anode 130 and a third cathode 131.

The LED driver 20 includes a first driving channel electrode 201, a second driving channel electrode 202, a third driving channel electrode 203, a power channel 200, and a common electrode 204. The first driving channel electrode 201 is connected to the first anode 110, the second driving channel electrode 202 is connected to the second anode 120, the third driving channel electrode 203 is connected to the third anode 130, the power channel electrode 200 is connected to the input pin 101, and the common electrode 204 is connected to the first cathode 111, the second cathode 121, the third cathode 131, and the output pin 102.

Firstly, the LED driver 20 turns on the first driving channel to generate a first current outputted from the first driving channel electrode 201, and simultaneously turns off the second driving channel and the third driving channel to stop generating a second current outputted from the second driving channel electrode 202 and a third current outputted from the third driving channel electrode 203 during a first opening duration.

Secondly, the LED driver 20 then turns on the second driving channel to generate the second current, and simultaneously turns off the first driving channel and the third driving channel to stop generating the first current and the third current during a second opening duration.

Lastly, the LED driver 20 then turns on the third driving channel to generate the third current, and simultaneously turns off the first driving channel and the second driving channel during a third opening duration.

It is worth noting that, the first opening duration, the second opening duration, and the third opening duration are continuous and non-overlapping, and the first current flows through the first LED, the second current flows through the second LED, and the third current flows through the third LED.

In one embodiment, the color-blending LED packages 10 are connected in series on the color-blending LED string.

After the LED driver 20 turns on the third driving channel during the third opening duration, the LED driver 20 further turns on a compensation channel to generate a compensation current outputted from the common electrode 204 to the output pin 102, and simultaneously turns off the first driving channel 201, the second driving channel 202, and the third driving channel 203 during a compensation opening duration. Moreover, the first opening duration, the second opening duration, the third opening duration, and the compensation opening duration are continuous and non-overlapping. Furthermore, an emitting period of the LED driver 20 is composed of the first opening duration, the second opening duration, the third opening duration, and the compensation opening duration.

Color and pattern variations on the color-blending LED string are achieved by adjusting the current to each individual LED channel. If the LED package 10 receives insufficient current, the LED package 10 will not perform as intended, which can lead to color imbalance or failure of the entire color-blending LED string. That is, the compensation current is needed for the color-blending LED string to prevent the problem.

In one embodiment, the color-blending LED packages 10 are connected in parallel on the color-blending LED string.

After the LED driver 20 turns on the third driving channel during the third opening duration, the LED driver 20 turns off the compensation channel to stop generating the compensation current outputted from the common electrode 204, and simultaneously turns off the first driving channel, the second driving channel, and the third driving channel during the compensation opening duration.

Moreover, the first opening duration, the second opening duration, the third opening duration, and the compensation opening duration are continuous and non-overlapping. Furthermore, the emitting period of the LED driver 20 is composed of the first opening duration, the second opening duration, the third opening duration, and the compensation opening duration.

When the color-blending LED packages 10 are connected in parallel, since there is no following LED package connected, the LED driver 20 does not need to prevent the problem of transmitting insufficient current, that is, the LED driver 20 turns off the compensation channel 204 in the emitting period.

In one embodiment, the color-blending LED string includes a power connection, a main controller, and a plurality of color-blending LED packages 10. The main controller transmits multiple driving signals to the LED packages 10. The first current, the second current, and the third current are superimposed on a power current, and the LED driver 20 generates the first current, the second current, and the third current according to the driving signals identified by a duration of a current change of the power current. The driving signals are transmitted through the power current through a power line cable via the main controller. The main controller transmits the driving signals, and when the LED driver 20 of the LED package 10 receives the driving signals, the LED driver 20 controls the first driving channel 201, the second driving channel 202, and the third driving channel 203 to generate the first current to the first LED 11, the second current to the second LED 12, and the third current to the third LED 13. The driving signals include a first duration signal, a second duration signal, and a third duration signal.

In the embodiment, the power current implies multiple driving signals of how the LED driver 20 should turn on the first driving channel, the second driving channel, the third driving channel, and the compensation channel. For example, the driving signals include a first duration signal, a second duration signal, and a third duration signal.

The first duration signal represents the first opening duration of the first driving channel to be turned on. The second duration signal represents the combination of the first opening duration and the second opening duration of the second driving channel to be turned on. The third duration signal represents the combination of the first opening duration, the second opening duration, and the third opening duration of the third driving channel to be turned on.

Furthermore, the LED driver 20 is preset with the emitting period, that is, when the LED driver 20 receives the driving signals, the LED driver 20 calculates the first opening duration, the second opening duration, and the third opening duration.

When the LED driver 20 receives the first duration signal, the LED driver 20 turns on the first driving channel for the first opening duration regarding the first duration signal. When the LED driver 20 receives the second duration signal, the LED driver 20 calculates a first-second duration difference from the first duration signal and the second duration signal, and turns on the second driving channel for the second opening duration regarding the first-second duration difference. When the LED driver 20 receives the third duration signal, the LED driver 20 calculates a second-third duration difference from the second duration signal and the third duration signal, and turns on the third driving channel for the third opening duration regarding the second-third duration difference.

When a sum of the first opening duration, the second opening duration, and the third opening duration is less than the emitting period, the LED driver 20 further calculates the compensation opening duration, and decides whether to turn on the compensation channel to generate the compensation current during the compensation opening duration.

In one embodiment, the driving signal is a pulse-width modulation (PWM) driving signal.

Figure 4:
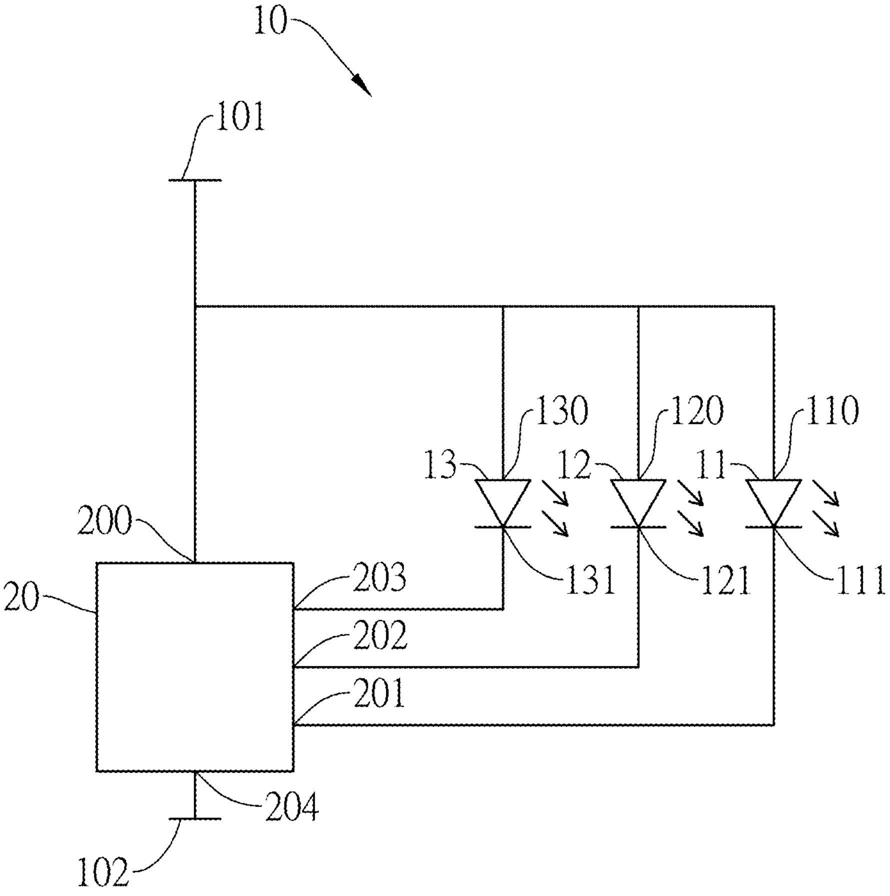
FIG. 4 is another circuit diagram of the power compensation method for the color-blending LED package of the present invention.
Figure 5:
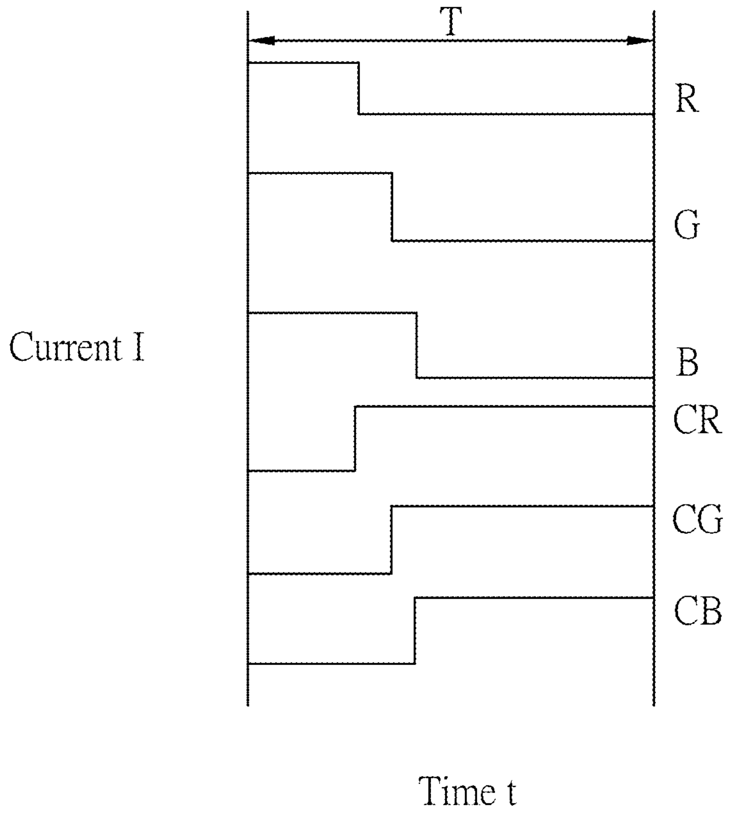
FIG.5 PRIOR ART
FIG. 5 is a current-time diagram of a conventional current control method.

With reference to FIG. 4, FIG. 4 is another circuit diagram of the power compensation method for the color-blending LED package of the present invention.

The present invention provides another color-blending LED package 10. The LED package 10 includes an input pin 101, an output pin 102, a first LED 11, a second LED 12, a third LED 13, and an LED driver 20.

The first LED 11 includes a first anode 110 and a first cathode 111. The second LED 12 includes a second anode 120 and a second cathode 121. The third LED 13 includes a third anode 130 and a third cathode 131.

The LED driver 20 includes a first driving channel electrode 201, a second driving channel electrode 202, a third driving channel electrode 203, a power channel 200, and a common electrode 204. The first driving channel electrode 201 is connected to the first cathode 111, the second driving channel electrode 202 is connected to the second cathode 121, the third driving channel electrode is connected to the third cathode 131, the power channel electrode 200 is connected to the first anode 110, the second anode 120, the third anode 130, and the input pin 101, and the common electrode 204 is connected to the output pin 102.

Firstly, the LED driver 20 turns on the first driving channel to generate a first current outputted to the first driving channel electrode 201, and simultaneously turns off the second driving channel and the third driving channel to stop generating a second current outputted to the second driving channel electrode 202 and a third current outputted to the third driving channel electrode 203 during a first opening duration.

Secondly, the LED driver 20 then turns on the second driving channel to generate the second current, and simultaneously turns off the first driving channel and the third driving channel to stop generating the first current and the third current during a second opening duration.

Lastly, the LED driver 20 then turns on the third driving channel to generate the third current, and simultaneously turns off the first driving channel and the second driving channel during a third opening duration.

It is worth noting that, the first opening duration, the second opening duration, and the third opening duration are continuous and non-overlapping, and the first current flows through the first LED, the second current flows through the second LED, and the third current flows through the third LED.

In one embodiment, the color-blending LED packages 10 are connected in series on the color-blending LED string.

After the LED driver 20 turns on the third driving channel during the third opening duration, the LED driver 20 further turns on a compensation channel to generate a compensation current outputted to the common electrode 204 to the output pin 102, and simultaneously turns off the first driving channel, the second driving channel, and the third driving channel during a compensation opening duration. Moreover, the first opening duration, the second opening duration, the third opening duration, and the compensation opening duration are continuous and non-overlapping. Furthermore, an emitting period of the LED driver 20 is composed of the first opening duration, the second opening duration, the third opening duration, and the compensation opening duration.

Color and pattern variations on the color-blending LED string are achieved by adjusting the current to each individual LED channel. If the LED package 10 receives insufficient current, the LED package 10 will not perform as intended, which can lead to color imbalance or failure of the entire color-blending LED string. That is, the compensation current is needed for the color-blending LED string to prevent the problem.

In one embodiment, the color-blending LED packages 10 are connected in parallel on the color-blending LED string.

After the LED driver 20 turns on the third driving channel during the third opening duration, the LED driver 20 turns off the compensation channel to stop generating the compensation current outputted to the common electrode 204, and simultaneously turns off the first driving channel, the second driving channel, and the third driving channel during the compensation opening duration.

Moreover, the first opening duration, the second opening duration, the third opening duration, and the compensation opening duration are continuous and non-overlapping. Furthermore, the emitting period of the LED driver 20 is composed of the first opening duration, the second opening duration, the third opening duration, and the compensation opening duration.

When the color-blending LED packages 10 are connected in parallel, since there is no following LED package connected, the LED driver 20 does not need to prevent the problem of transmitting insufficient current, that is, the LED driver 20 turns off the compensation channel 204 in the emitting period.

In one embodiment, the color-blending LED string includes a power connection, a main controller, and a plurality of color-blending LED packages 10. The main controller transmits multiple driving signals to the LED packages 10. The first current, the second current, and the third current are superimposed on a power current, and the LED driver 20 generates the first current, the second current, and the third current according to the driving signals identified by a duration of a current change of the power current. The driving signals are transmitted through the power current through a power line cable via the main controller. The main controller transmits the driving signals, and when the LED driver 20 of the LED package 10 receives the driving signals, the LED driver 20 controls the first driving channel 201, the second driving channel 202, and the third driving channel 203 to generate the first current to the first LED 11, the second current to the second LED 12, and the third current to the third LED 13. The driving signals include a first duration signal, a second duration signal, and a third duration signal.

In the embodiment, the power current implies multiple driving signals of how the LED driver 20 should turn on the first driving channel, the second driving channel, the third driving channel, and the compensation channel. For example, the driving signals include a first duration signal, a second duration signal, and a third duration signal.

The first duration signal represents the first opening duration of the first driving channel to be turned on. The second duration signal represents the combination of the first opening duration and the second opening duration of the second driving channel to be turned on. The third duration signal represents the combination of the first opening duration, the second opening duration, and the third opening duration of the third driving channel to be turned on.

Furthermore, the LED driver 20 is preset with the emitting period, that is, when the LED driver 20 receives the driving signals, the LED driver 20 calculates the first opening duration, the second opening duration, and the third opening duration.

When the LED driver 20 receives the first duration signal, the LED driver 20 turns on the first driving channel for the first opening duration regarding the first duration signal. When the LED driver 20 receives the second duration signal, the LED driver 20 calculates a first-second duration difference from the first duration signal and the second duration signal, and turns on the second driving channel for the second opening duration regarding the first-second duration difference. When the LED driver 20 receives the third duration signal, the LED driver 20 calculates a second-third duration difference from the second duration signal and the third duration signal, and turns on the third driving channel for the third opening duration regarding the second-third duration difference.

When a sum of the first opening duration, the second opening duration, and the third opening duration is less than the emitting period, the LED driver 20 further calculates the compensation opening duration, and decides whether to turn on the compensation channel to generate the compensation current during the compensation opening duration.

In one embodiment, the driving signal is a pulse-width modulation (PWM) driving signal.

The present invention allows the LED driver 10 to reduce the total current of the LED string, further reducing high peak output current and voltage drop on the LED string, resulting in reducing power consumption compared to the conventional current control method, and providing the same power to each serial LED package.

What is claimed is:

1. A power compensation method for a color-blending light emitting diode (LED) string with a power line communication (PLC), executed by an LED driver of an LED package of a color-blending LED string; wherein, the color-blending LED string comprises multiple LED packages connected in series, and the method comprising:

turning on a first driving channel of the LED driver to generate a first current, and simultaneously turning off a second driving channel and a third driving channel to stop generating a second current and a third current of the LED driver during a first opening duration;

turning on the second driving channel to generate the second current, and simultaneously turning off the first driving channel and the third driving channel to stop generating the first current and the third current during a second opening duration;

turning on the third driving channel to generate the third current, and simultaneously turning off the first driving channel and the second driving channel to stop generating the first current and the second current during a third opening duration;

turning on a compensation channel to generate a compensation current, and simultaneously turning off the first driving channel, the second driving channel, and the third driving channel during a compensation opening duration;

wherein, the first current flows through a first LED of the LED package of the color-blending LED string, the second current flows through a second LED of the LED package of the color-blending LED string, and the third current flows through a third LED of the LED package of the color-blending LED string;

wherein, the first opening duration, the second opening duration, the third opening duration, and the compensation opening duration are continuous and non-overlapping;

wherein, an emitting period of the LED driver is composed of the first opening duration, the second opening duration, the third opening duration, and the compensation opening duration;

wherein, the compensation channel generates the compensation current to an output pin of the LED package of the color-blending LED string.

2. The power compensation method as claimed in claim 1, wherein, the first current, the second current, and the third current are superimposed on a power current, and the LED driver generates the first current, the second current, and the third current according to a driving signal identified by a duration of a current change of the power current.

3. The power compensation method as claimed in claim 2, wherein, the driving signal is a pulse-width modulation (PWM) driving signal.

4. A color-blending LED package, comprising:

an input pin;

an output pin;

a first LED, comprising a first anode and a first cathode;

a second LED, comprising a second anode and a second cathode;

a third LED, comprising a third anode and a third cathode;

an LED driver, comprising:

a first driving channel electrode, connected to the first anode;

a second driving channel electrode, connected to the second anode;

a third driving channel electrode, connected to the third anode; and a power channel electrode, connected to the input pin;

a common electrode, connected to the first cathode, the second cathode, the third cathode, and the output pin;

wherein, the LED driver turns on a first driving channel to generate a first current outputted from the first driving channel electrode, and simultaneously turns off a second driving channel and a third driving channel to stop generating a second current outputted from the second driving channel electrode and a third current outputted from the third driving channel electrode during a first opening duration;

wherein, the LED driver turns on the second driving channel to generate the second current, and simultaneously turns off the first driving channel and the third driving channel to stop generating the first current and the third current during a second opening duration;

wherein, the LED driver turns on the third driving channel to generate the third current, and simultaneously turns off the first driving channel and the second driving channel to stop generating the first current and the second current during a third opening duration;

wherein, the LED driver turns on a compensation channel to generate a compensation current outputted from the common electrode, and simultaneously turns off the first driving channel, the second driving channel, and the third driving channel during a compensation opening duration;

wherein, the first current flows through the first LED, the second current flows through the second LED, and the third current flows through the third LED;

wherein, the first opening duration, the second opening duration, the third opening duration, and the compensation opening duration are continuous and non-overlapping;

wherein, an emitting period of the LED driver is composed of the first opening duration, the second opening duration, the third opening duration, and the compensation opening duration;

wherein, the compensation current flows to the output pin.

5. The color-blending LED package as claimed in claim 4, wherein, the first current, the second current, and the third current are superimposed on a power current, and the LED driver generates the first current, the second current, and the third current according to a driving signal identified by a duration of a current change of the power current.

6. The power compensation method as claimed in claim 5, wherein, the driving signal is a pulse-width modulation (PWM) driving signal.

7. A color-blending LED package, comprising:

an input pin;

an output pin;

a first LED, comprising a first anode and a first cathode;

a second LED, comprising a second anode and a second cathode;

a third LED, comprising a third anode and a third cathode;

an LED driver, comprising:

a first driving channel electrode, connected to the first cathode;

a second driving channel electrode, connected to the second cathode;

a third driving channel electrode, connected to the third cathode; and a power channel electrode, connected to the first anode, the second anode, the third anode, and the input pin;

a common electrode, connected to the output pin;

wherein, the LED driver turns on a first driving channel to generate a first current outputted to the first driving channel electrode, and simultaneously turns off a second driving channel outputted to the second driving channel electrode and a third driving channel to stop generating a second current and a third current outputted to the third driving channel electrode during a first opening duration;

wherein, the LED driver turns on the second driving channel to generate the second current, and simultaneously turns off the first driving channel and the third driving channel during a second opening duration;

wherein, the LED driver turns on the third driving channel to generate the third current, and simultaneously turns off the first driving channel and the second driving channel during a third opening duration;

wherein, the LED driver turns on a compensation channel to generate a compensation current outputted to the common electrode, and simultaneously turns off the first driving channel, the second driving channel, and the third driving channel during a compensation opening duration;

wherein, the first current flows through the first LED, the second current flows through the second LED, and the third current flows through the third LED;

wherein, the first opening duration, the second opening duration, the third opening duration, and the compensation opening duration are continuous and non-overlapping;

wherein, an emitting period of the LED driver is composed of the first opening duration, the second opening duration, the third opening duration, and the compensation opening duration;

wherein, the compensation current flows to the output pin.

8. The color-blending LED package as claimed in claim 7, wherein, the first current, the second current, and the third current are superimposed on a power current, and the LED driver generates the first current, the second current, and the third current according to a driving signal identified by a duration of a current change of the power current.

9. The power compensation method as claimed in claim 8, wherein, the driving signal is a pulse-width modulation (PWM) driving signal.

* * * * *